(12) United States Patent
Lee et al.

(10) Patent No.: US 10,960,799 B2
(45) Date of Patent: Mar. 30, 2021

(54) CAR SEAT LUMBAR SUPPORT UNIT WITH SIMPLIFIED STRUCTURE AND IMPROVED RESPONSIVENESS

(71) Applicant: DAEDONG SYSTEM CO., LTD., Incheon (KR)

(72) Inventors: Ho Chul Lee, Incheon (KR); In Seob Ju, Incheon (KR); Jung Jo Lim, Ansan-si (KR)

(73) Assignee: DAEDONG SYSTEM CO., LTD, Incheon (KR)

( * ) Notice: Subject to any disclaimer, the term of this patent is extended or adjusted under 35 U.S.C. 154(b) by 0 days.

(21) Appl. No.: 16/709,553

(22) Filed: Dec. 10, 2019

(65) Prior Publication Data

US 2020/0189429 A1    Jun. 18, 2020

(30) Foreign Application Priority Data

Dec. 17, 2018  (KR) ........................ 10-2018-0162750

(51) Int. Cl.
   *B60N 2/66*    (2006.01)

(52) U.S. Cl.
   CPC ........... *B60N 2/666* (2015.04); *B60N 2/6673* (2015.04)

(58) Field of Classification Search
   CPC ...... B60N 2/666; B60N 2/667; B60N 2/6671; B60N 2/6673
   See application file for complete search history.

(56) References Cited

U.S. PATENT DOCUMENTS

| 5,609,394 A | * | 3/1997 | Ligon, Sr. ............ | B60N 2/6671 297/284.1 |
| 2002/0113472 A1 | * | 8/2002 | Blendea ............... | B60N 2/6673 297/284.4 |
| 2004/0084942 A1 | * | 5/2004 | Frank ................... | B60N 2/0232 297/284.4 |
| 2007/0270729 A1 | * | 11/2007 | Gobbo ................. | B60N 2/6671 602/19 |
| 2016/0250957 A1 | * | 9/2016 | Yoo ...................... | B60N 2/6673 297/284.7 |
| 2018/0015860 A1 | * | 1/2018 | Bhatia .................. | B60N 2/6673 |
| 2018/0116406 A1 | * | 5/2018 | Galbreath ............... | B60N 2/66 |

FOREIGN PATENT DOCUMENTS

| DE | 102016219104 A1 | * | 4/2018 | .......... B60N 2/6673 |
| KR | 10-1398321 B1 |  | 5/2014 |  |
| WO | WO-2017022492 A1 | * | 2/2017 | ............. B60N 2/666 |
| WO | WO-2017022493 A1 | * | 2/2017 | ............. B60N 2/666 |

* cited by examiner

*Primary Examiner* — Timothy J Brindley
(74) *Attorney, Agent, or Firm* — Novick, Kim & Lee, PLLC; Sang Ho Lee

(57) ABSTRACT

A car seat lumbar support unit performs an elevating operation of an upper bracket relative to a lower bracket which determines a degree of curvature of a seat back by using a first motor, a first transfer screw, and a first nut member (first elevating unit) that are easily designed and manufactured, and performs an elevating operation of the lower bracket and the upper bracket which determines a curved position of the seat back by using a second motor, a second transfer screw, and a second nut member (second elevating unit), wherein a rotary cylinder is organically coupled so that the first elevating unit and the second elevating unit are independently operable without being restricted by each other.

3 Claims, 7 Drawing Sheets

CAR SEAT LUMBAR SUPPORT UNIT WITH SIMPLIFIED STRUCTURE AND IMPROVED RESPONSIVENESS

TECHNICAL FIELD

The present disclosure relates to a car seat lumbar support unit, and more particularly, to a car seat lumbar support unit with a simplified structure and improved responsiveness which may improve responsive performance with respect to an operation input, may simplify a structure, and may enable an optimal arrangement of components in a narrow space.

BACKGROUND ART

A lumbar support unit embedded inside a car seat and providing convenience of allowing a seat back line to have an angle corresponding to a degree of curvature of a driver's lumbar vertebrae may adjust the seat back line by being raised/lowered inside the car seat according to a button operation of the driver and being located at a desired position.

The lumbar support unit includes a guide that is fixedly provided on the car seat, an elevating bracket that is raised/lowered along the guide and on which a line adjusting band for adjusting a degree of curvature of the seat back line is mounted, and a motor unit that raises/lowers the elevating bracket, as shown in FIG. 1.

However, a conventional lumbar support unit has disadvantages in that responsive performance is reduced because power connection between one of elevating brackets and a motor is made through a drive cable, and structure complexity and manufacturing costs are increased because many components such as a worm gear for changing a power transmission direction to make power connection between the other of the elevating brackets and the motor are required.

Related prior art documents include Korean Patent Registration No. 10-1398321 (registered on May 15, 2014).

DESCRIPTION OF EMBODIMENTS

Technical Problem

To solve the above problems, an objective of the present disclosure is to provide a car seat lumbar support unit with a simplified structure and improved responsiveness which may improve product reliability by improving responsive performance with respect to an operation input, may reduce manufacturing costs by simplifying a structure, and may enable many components to be driven without being interrupted with one another in a narrow space.

Solution to Problem

Advantageous Effects of Disclosure

A car seat lumbar support unit with a simplified structure and improved responsiveness constructed as described above performs an elevating operation of an upper bracket relative to a lower bracket, which determines a degree of curvature of a seat back by using a first motor, a first transfer screw, and a first nut member (first elevating unit) that are easily designed and manufactured, and performs an elevating operation of the lower bracket and the upper bracket, which determines a curved position of the seat back by using a second motor, a second transfer screw, and a second nut member (second elevating unit), wherein a rotary cylinder is organically coupled so that the first elevating unit and the second elevating unit are independently operable without being restricted by each other. Accordingly, manufacturing costs may be reduced by facilitating a product design and simplifying a structure, and responsiveness to an operation of each component may be improved by directly transmitting a rotational force of a motor that is a power source to a lower bracket and an upper bracket through a transfer screw and a nut member, thereby improving product reliability.

MODE OF DISCLOSURE

Figure 1:
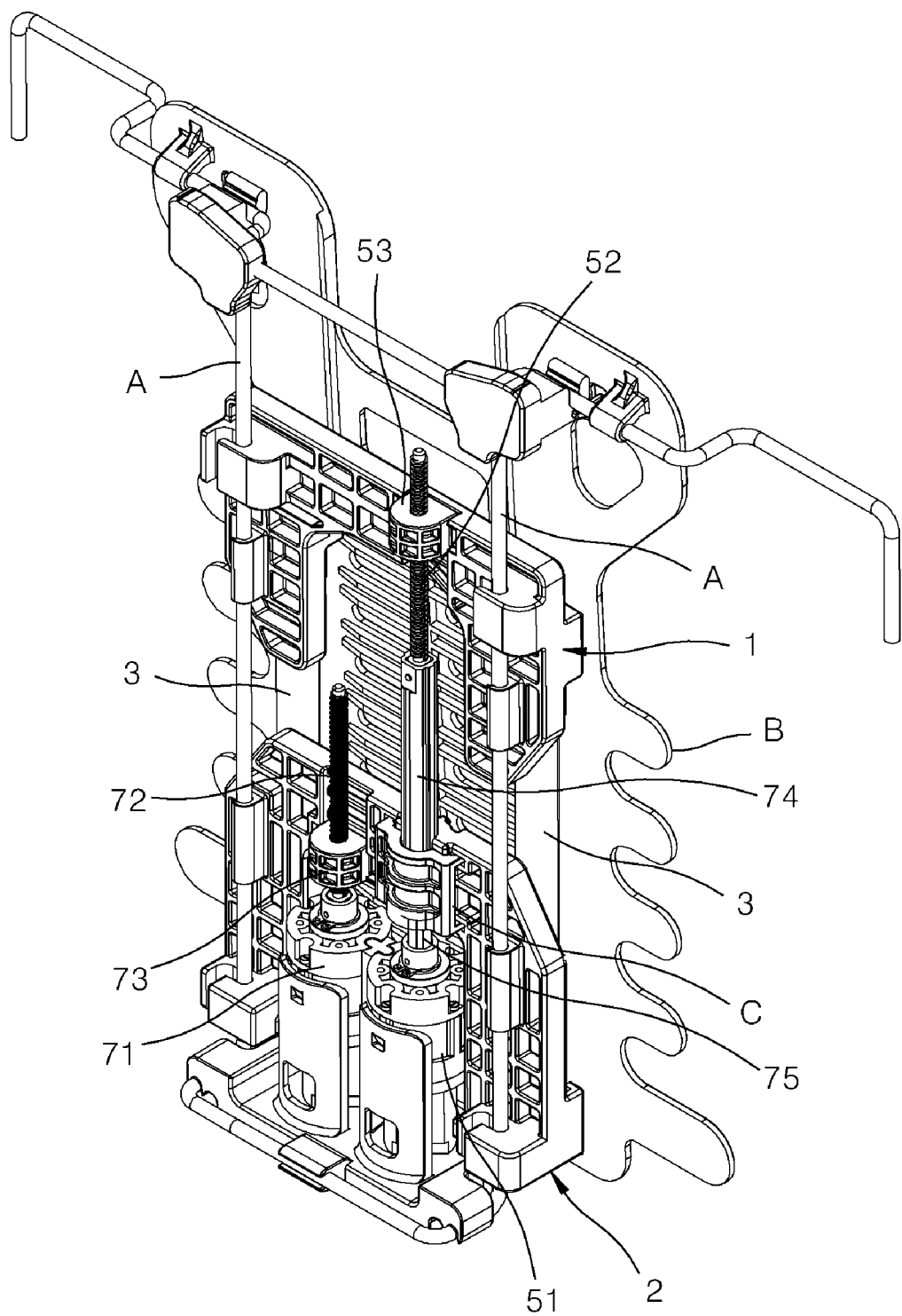
FIG. 1 is a perspective view of a car seat lumbar support unit with a simplified structure and improved responsiveness according to an embodiment of the present disclosure.

In the following description, explanations of known technology for the feature of the present disclosure will be omitted to clearly understand the present disclosure. The following embodiments are intended to illustrate the present disclosure and should not be construed as limiting the scope of the present disclosure. Accordingly, equivalents that perform the same functions as the present disclosure are within the scope of the present disclosure.

In the following description, the same elements are denoted by the same reference numerals and repeated explanations and explanations of known technology will be omitted. Also, explanations of each embodiment of the present disclosure which overlap explanations of the background art will be omitted.

A car seat lumbar support unit with a simplified structure and improved responsiveness according to an embodiment of the present disclosure will now be described in detail with reference to the attached drawings.

Figure 2:
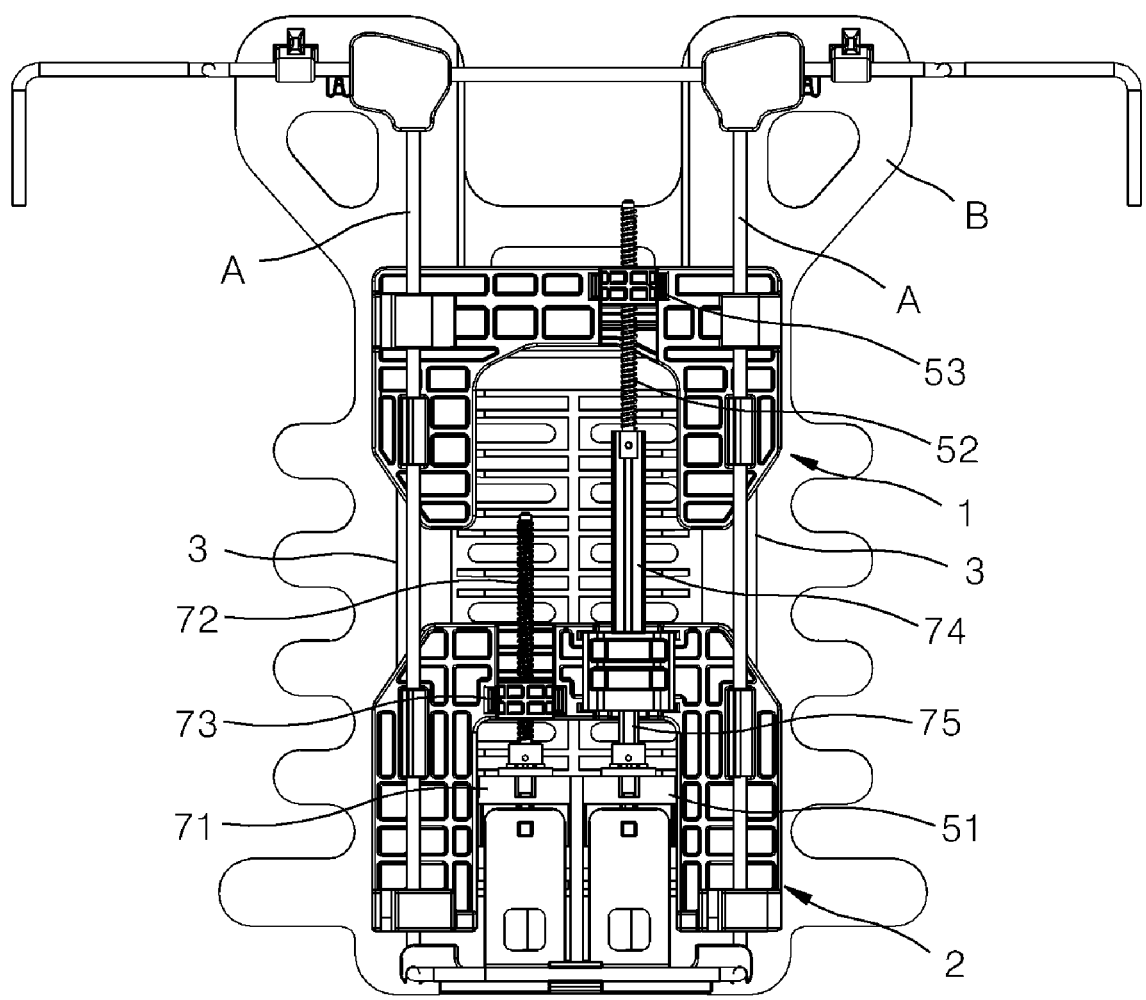
FIG. 2 is a front view of an embodiment of the present disclosure.
Figure 3:
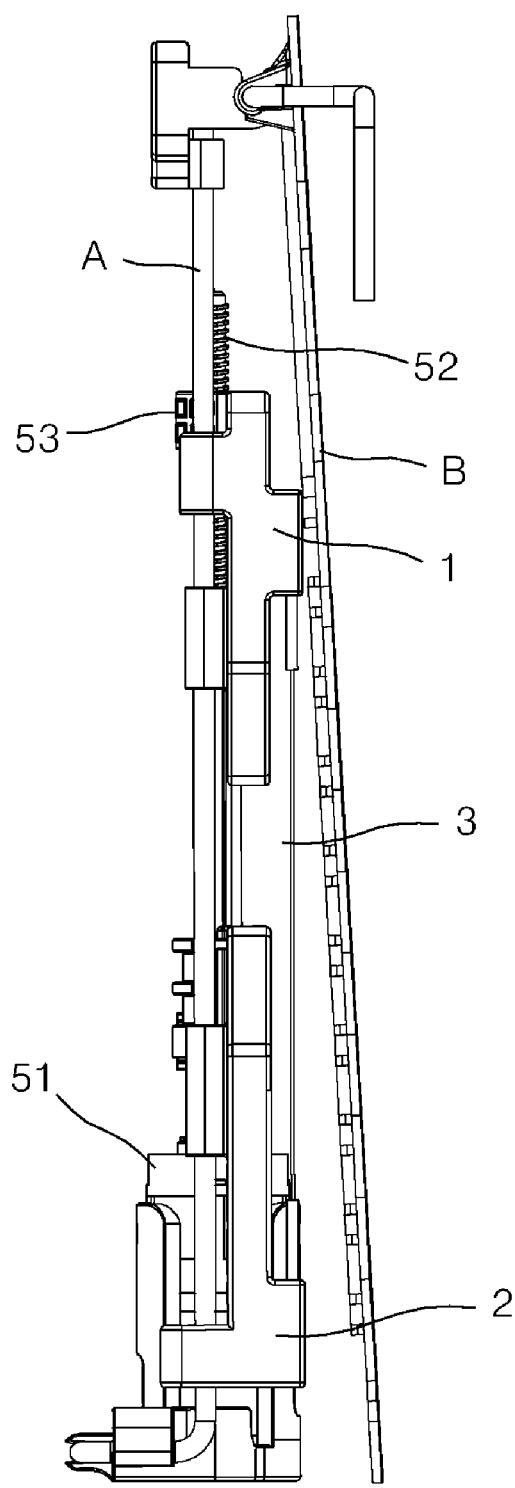
FIG. 3 is a right side view of an embodiment of the present disclosure.
Figure 4:
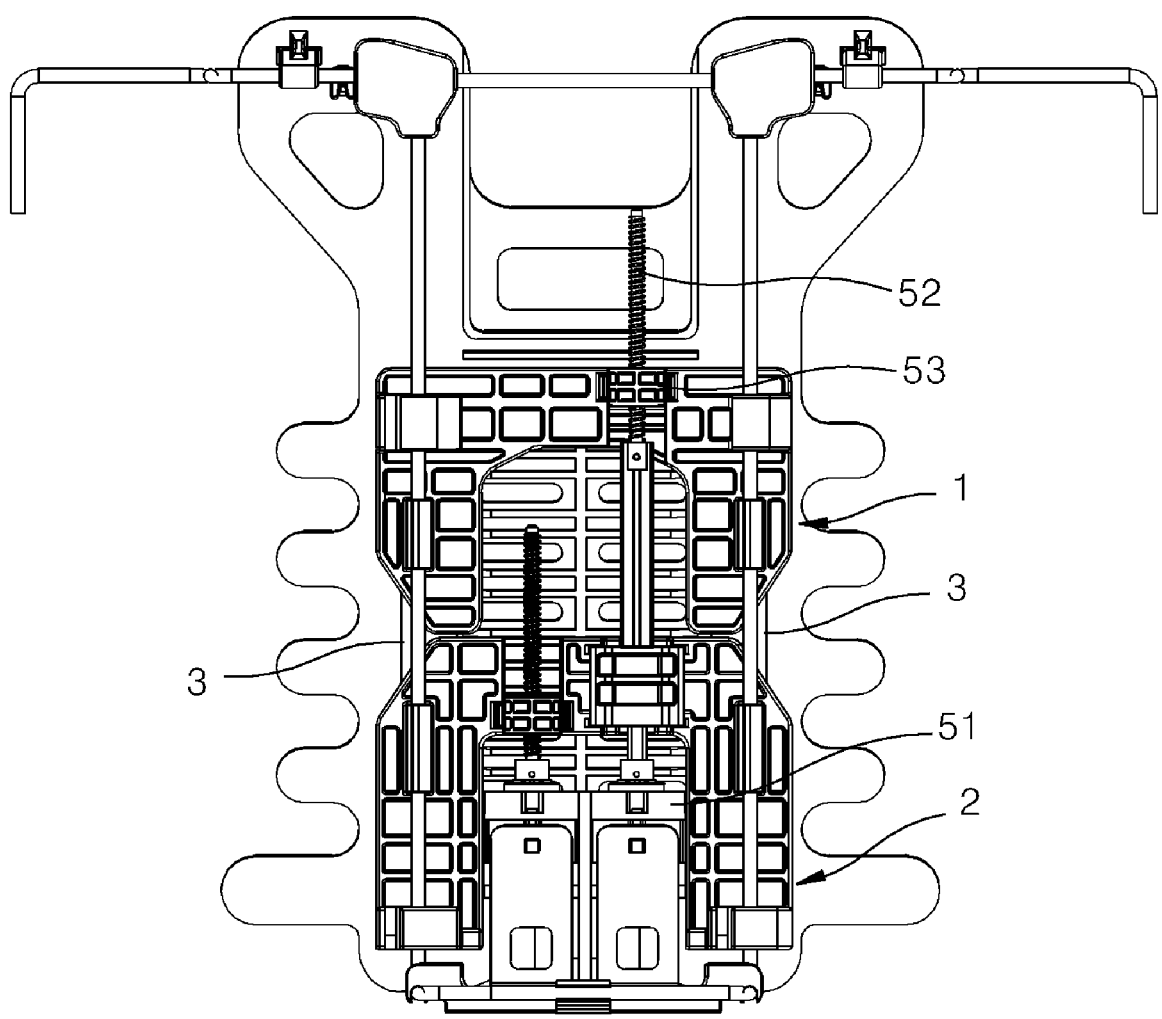
FIGS. 4 and 5 are views for describing a working mechanism of a first elevating unit according to an embodiment of the present disclosure.
Figure 5:
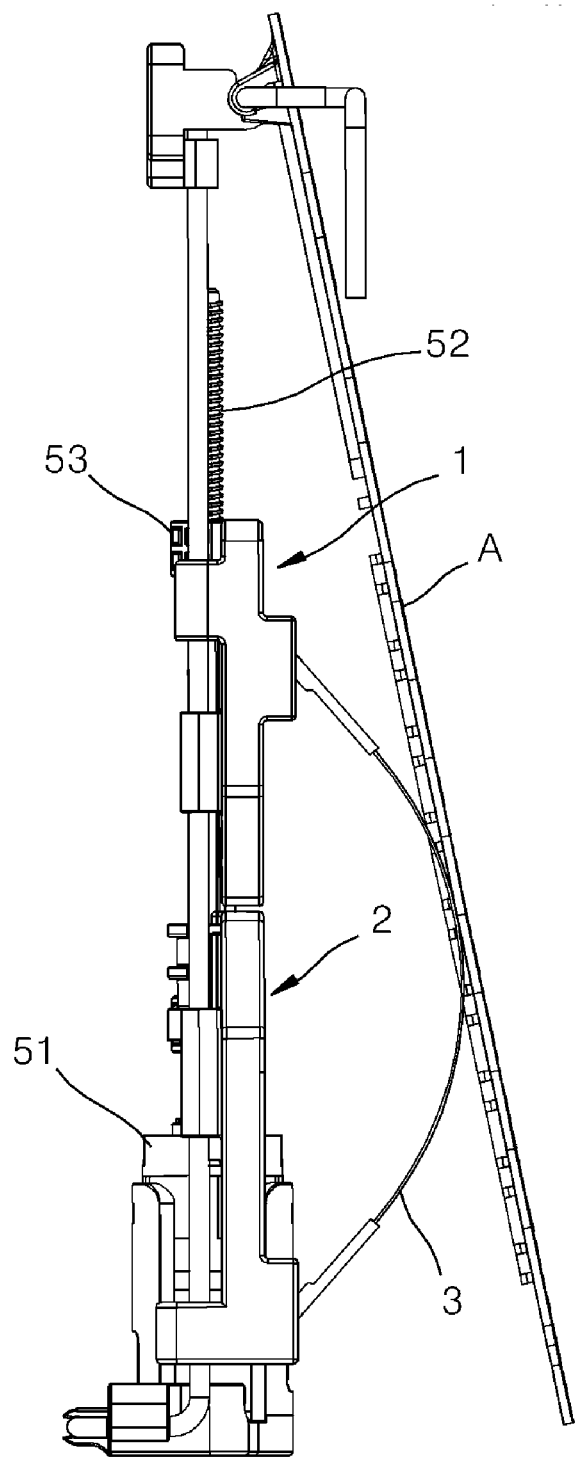
Figure 6:
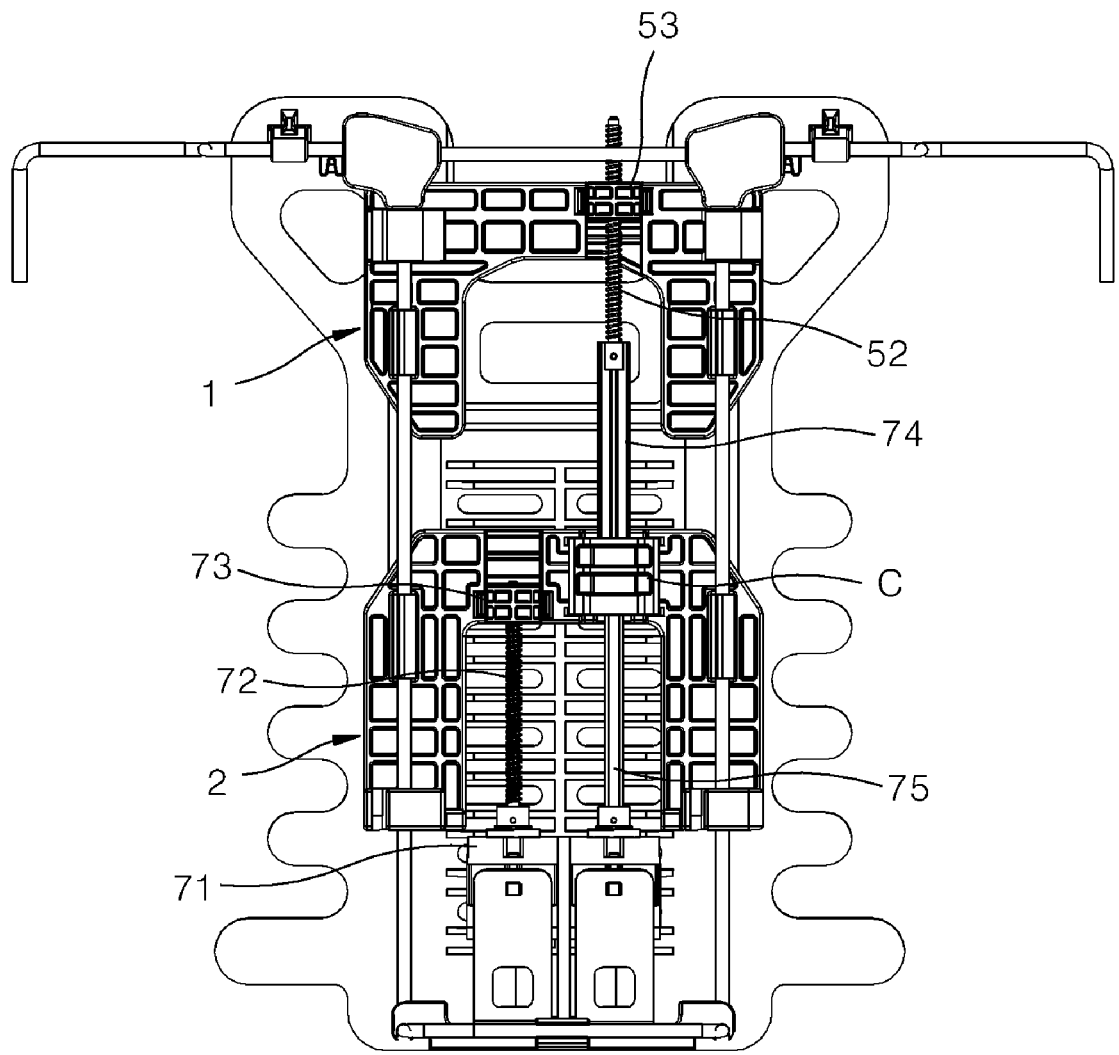
FIGS. 6 and 7 are views for describing a working mechanism of a second elevating unit according to an embodiment of the present disclosure.
Figure 7:
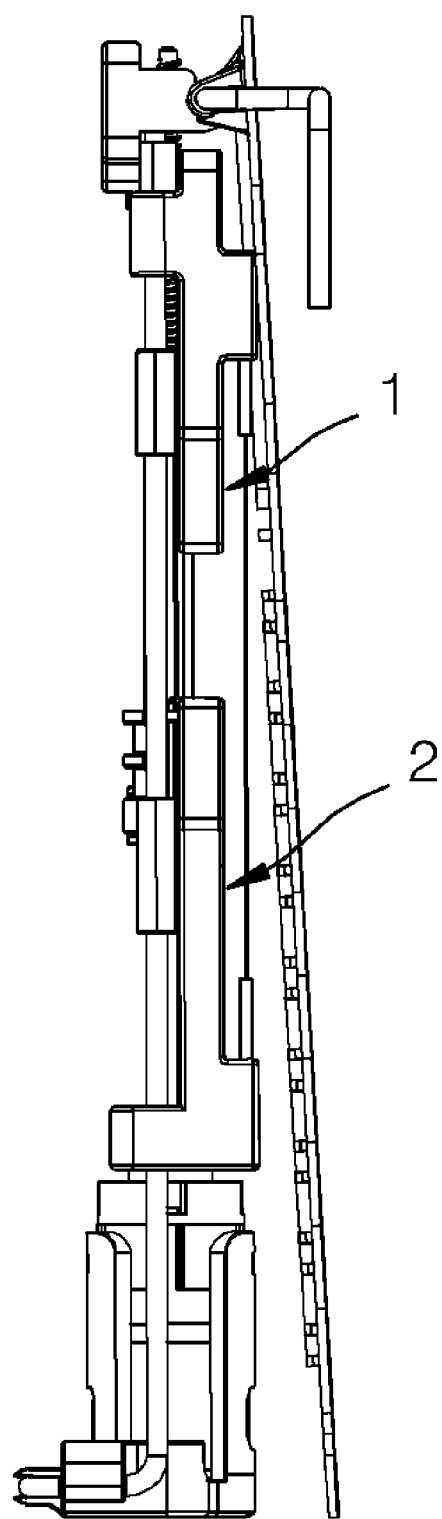

FIG. 1 is a perspective view of a car seat lumbar support unit with a simplified structure and improved responsiveness according to an embodiment of the present disclosure. FIG. 2 is a front view of an embodiment of the present disclosure. FIG. 3 is a right side view of an embodiment of the present disclosure. FIGS. 4 and 5 are views for describing a working mechanism of a first elevating unit according to an embodiment of the present disclosure. FIGS. 6 and 7 are views for describing a working mechanism of a second elevating unit according to an embodiment of the present disclosure.

As shown in FIGS. 1 through 3, a car seat lumbar support unit with a simplified structure and improved responsiveness according to an embodiment of the present disclosure which may provide user convenience of allowing a seat back line to have an angle corresponding to a degree of curvature of a driver's lumbar vertebrae includes an upper bracket 1, a lower bracket 2, a curved band 3, and first and second elevating units.

The upper bracket 1 is provided to be vertically elevatable along a guide A fixed inside a car seat and approaches or separates from the lower bracket 2 according to an electrical signal according to a user's manipulation.

For example, when the upper bracket 1 is lowered to a position shown in FIGS. 2 through 4 to approaches the lower bracket 2, a bending angle of the curved band 3 may increase as shown in FIG. 5 and an inclination angle of a lower portion of a seat back B may increase as the curved band 3 is bent, thereby providing convenience suitable for a driver's body condition.

The lower bracket 2 is provided at a position spaced apart from the upper bracket 1 to be elevatable along the guide A, and approaches and separates from the upper bracket 1 inside the car seat.

The curved band 3 has one end fixed to the upper bracket 1 and the other end fixed to the lower bracket 2, is formed of an elastically deformable material, and is bent and stretched according to a degree to which the one pair of brackets, that is, the upper bracket 1 and the lower bracket 2, approach each other as shown in FIGS. 3 and 5. The curved band 3 may be connected to the seat back B and may enable the seat back B to be adjusted to an angle suitable for the driver.

The first elevating unit may enable the seat back B to be curved at an appropriate angle by causing the upper bracket 1 to approach the lower bracket 2 as shown in FIGS. 4 and 5, and the second elevating unit may enable a most curved portion of the seat back B to be formed at a desired position by causing the upper bracket 1 and the lower bracket 2 to be raised/lowered together as shown in FIGS. 6 and 7.

The first elevating unit according to an embodiment of the present disclosure for allowing the upper bracket 1 to approach and separate from the lower bracket 2 includes a first motor 51, a first transfer screw 52, and a first nut member 53, as shown in FIGS. 4 and 5.

The first motor 51 is a power source that provides power for raising/lowering the upper bracket 1 relative to the lower bracket 2, and the first transfer screw 52 is longitudinally formed along a movement direction of the upper bracket 1 and is connected to a driving shaft of the first motor 51 to be rotatable together with the driving shaft of the first motor 51.

The first nut member 53 for changing a rotary motion of the first transfer screw 52 into a linear motion of the upper bracket 1 is provided on the upper bracket 1 and is screwed to the first transfer screw 52.

The second elevating unit according to an embodiment of the present disclosure for raising/lowering the lower bracket 2 and the upper bracket 1 together includes a second motor 71, a second transfer screw 72, a second nut member 73, and a rotary cylinder 74, as shown in FIGS. 6 and 7.

The second motor 71 having the same configuration as that of the first motor 51 is a power source that provides power for vertically raising/lowering the lower bracket 2 and the upper bracket 1 together, and the second transfer screw 72 is longitudinally formed along a movement direction of the lower bracket 2, has the same structure as that of the first transfer screw 52 except for its length, and is connected to a driving shaft of the second motor 71 to be rotatable together with the driving shaft of the second motor 71.

The second nut member 73 for changing a rotary motion of the second transfer screw 72 into a linear motion of the lower bracket 2 is provided on the lower bracket 2 and is screwed to the second transfer screw 72. It is preferable that the second nut member 73 is formed to have the same structure as that of the first nut member 53 for the purpose of configuration simplification and ease of molding.

The rotary cylinder 74 has one side screwed to the first nut member 53 and the other side connected to the driving shaft of the first motor 51 to have a restricted rotation and a free movement so that the upper bracket 1 connected to the lower bracket 2 through the curved band 3 is movable together with the lower bracket 2 without being affected by a coupling relationship between the first transfer screw 52 and the first nut member 53.

That is, the upper bracket 1 and the lower bracket 2 are connected to each other via the curved band 3, once the lower bracket 2 moves upward, and thus the upper bracket 12 connected to the curved band 3 may also move.

However, because the upper bracket 1 is dynamically connected to the lower bracket 2 by the first transfer screw 52 and the first nut member 53 as well as the curved band 3, an elevating operation of the lower bracket 2 and the upper bracket 1 according to a driving of the second motor 71 may be affected by the first transfer screw 52 and the first nut member 53.

Accordingly, the second elevating unit according to an embodiment of the present disclosure includes the rotary cylinder 74 that prevents the second elevating unit from being affected by the driving of the first elevating unit and the first elevating unit from being affected by the driving of the second elevating unit.

That is, the rotary cylinder 74 has one side connected to the first transfer screw 52 to be rotatable together with the first transfer screw 52 and the other side to which the driving shaft of the first motor 51 is dynamically connected. A non-circular groove portion that is longitudinally formed along a movement direction of the upper bracket 1 is formed inside the rotary cylinder 74, and the driving shaft of the first motor 51 includes a non-circular cross-sectional portion 75 engaged with the non-circular groove portion.

According to the present embodiment, when the first motor 51 rotates, the rotary cylinder 74 and the first transfer screw 52 rotate due to the engagement of the non-circular cross-sectional portion 75 and the non-circular groove portion, and in contrast, when the rotary cylinder 74 moves, the non-circular cross-sectional portion 75 of the first motor 51 slides in the non-circular groove portion.

In this configuration, the car seat lumbar support unit with a simplified structure and improved responsiveness according to an embodiment of the present disclosure performs an elevating operation of the upper bracket 1 relative to the lower bracket 2 which determines a degree of curvature of the seat back B by using the first motor 51, the first transfer screw 52, and the first nut member 53 (first elevating unit) that are easily designed and manufactured, and performs an elevating operation of the lower bracket 2 and the upper bracket 1 which determines a curved position of the seat back B by using the second motor 71, the second transfer screw 72, and the second nut member 73 (second elevating unit), wherein the rotary cylinder 74 is organically coupled so that the first elevating unit and the second elevating unit are independently operable without being restricted by each other.

According to the present embodiment, manufacturing costs may be reduced by facilitating a product design and simplifying a structure, and responsiveness to an operation of each component may be improved by directly transmitting a rotational force of a motor that is a power source to the lower bracket 2 and the upper bracket 1 through a transfer screw and a nut member, thereby improving product reliability.

A driving shaft of the first motor 51 may be located on the same axis as the first transfer screw 52 to improve responsiveness to an operation and the precision of power transmission, and it is preferable that a driving shaft of the second motor 71 is also located on the same axis as the second transfer screw 72 for the same reason as that of the first motor 51.

The driving shaft of the second motor 71 may be located parallel to the driving shaft of the first motor 51 to enable linear power transmission without changing a power transmission direction for transmitting a rotational force of a motor, thereby further improving responsiveness to an operation and precision.

In order to enhance such functions, it is preferable that a housing of the first motor 51 and a housing of the second motor 71 according to the present embodiment are located to respectively have the same central axes as those of the first transfer screw 52 and the second transfer screw 72.

In the drawings, reference numeral C denotes a guide cover that guides a movement of the rotary cylinder 74 relative to the driving shaft of the first motor 51.

While various embodiments of the present disclosure have been described, the present embodiment and the drawings attached to the specification are merely provided to explain part of the technical spirit of the present disclosure and it will be understood that all modifications or alternatives easily derived by one of ordinary skill in the art from the scope of the specification and the drawings fall within the scope of the present disclosure.

DESCRIPTION OF REFERENCE NUMERALS

1: upper bracket
2: lower bracket
3: curved band
51: first motor
52: first transfer screw
53: first nut member
71: second motor
72: second transfer screw
73: second nut member
74: rotary cylinder
75: non-circular cross-sectional portion
A: guide
B: seat back
C: guide cover

The invention claimed is:

1. A car seat lumbar support unit with a simplified structure and improved responsiveness, the car seat lumbar support unit comprising:
    an upper bracket provided to be vertically elevatable along a guide fixed inside a car seat;
    a lower bracket provided at a position spaced apart from the upper bracket to be elevatable along the guide and to be approachable and separable from the upper bracket inside the car seat;
    a curved band having one end fixed to the upper bracket and the other end fixed to the lower bracket, formed of an elastically deformable material, and bent and stretched according to a degree to which the upper bracket and the lower bracket approach each other;
    a first elevating unit for allowing the upper bracket to approach the lower bracket; and
    a second elevating unit for allowing the upper bracket and the lower bracket to be raised/lowered together,
    wherein the first elevating unit comprises:
    a first motor;
    a first transfer screw connected to a driving shaft of the first motor to be rotatable together with the driving shaft of the first motor; and
    a first nut member provided on the upper bracket and coupled to the first transfer screw to change a rotary motion of the first transfer screw into a linear motion of the upper bracket, and
    the second elevating unit comprises:
    a second motor;
    a second transfer screw connected to a driving shaft of the second motor to be rotatable together with the driving shaft of the second motor;
    a second nut member provided on the lower bracket and coupled to the second transfer screw to change a rotary motion of the second transfer screw into a linear motion of the lower bracket; and
    a rotary cylinder having one side screwed to the first nut member and the other side connected to the driving shaft of the first motor to have a restricted rotation and a free movement so that the upper bracket connected to the lower bracket through the curved band is movable together with the lower bracket without being affected by a coupling relationship between the first transfer screw and the first nut member.

2. The car seat lumbar support unit of claim 1, wherein the driving shaft of the first motor is located on the same axis as the first transfer screw, and
    the driving shaft of the second motor is located on the same axis as the second transfer screw and is located parallel to the driving shaft of the first motor.

3. The car seat lumbar support unit of claim 2, wherein a housing of the first motor and a housing of the second motor are located to have the same central axes as the axes in order to linearly transmit rotational forces of the first and second motors along the axes.

* * * * *